3,784,548
3-PIPERAZINYL-QUINOBENZOXA(OR THIA)
ZEPINE DERIVATIVES
Harry L. Yale, New Brunswick, and Ramesh Petigara, Somerset, N.J., assignors to E. R. Squibb & Sons, Inc., New York, N.Y.
No Drawing. Filed June 24, 1971, Ser. No. 156,557
Int. Cl. C07d 39/00
U.S. Cl. 260—268 PC        11 Claims

ABSTRACT OF THE DISCLOSURE 2,3-dihydroquinobenzoxa(or thia)zepine derivatives are provided having the structures

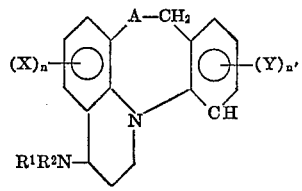

or

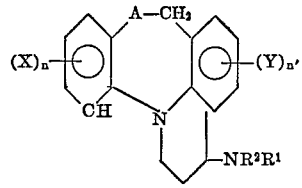

wherein A is O or S; X and Y are the same or different and can be halogen, trifluoromethyl, lower alkyl, cycloalkyl, lower alkyl, lower alkylmercapto, lower alkyloxy, cyano, isocyanido or di-lower alkyl-sulfamoyl; $R^1$ and $R^2$ taken together with the nitrogen to which they are attached may form a heterocyclic group having the formula

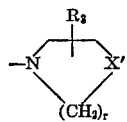

in which X' represents $NR^4$, O, S or $CH_2$, r represents 1, 2 or 3; $R^4$ represents hydrogen, lower alkyl, hydroxy-lower alkyl, lower alkanoyloxy-lower alkyl, hydroxy-lower alkoxy-lower alkyl; di(lower alkyl)amino-lower alkoxy-lower alkyl, lower-alkylamino-lower alkyl, di-lower alkyl amino-lower alkyl, amino-lower alkyl; and $R^3$ represents any of the $R^4$ groups; n is 0, 1 or 2; and n' is 0, 1 or 2. These compounds are useful as central nervous system stimulants, muscle relaxants, anti-inflammatory agents, and antibacterial agents.

---

The present invention relates to 3-amino-2,3-dihydro-quinobenzoxa(or thia)zepine derivatives of the structure

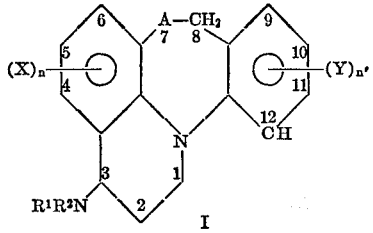

or

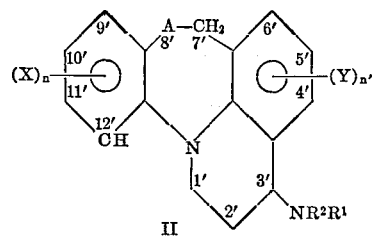

wherein X and Y are the same or different and can be halogen, trifluoromethyl, lower alkyl, cycloalkyl, lower alkylmercapto, lower alkyloxy, cyano, isocyanido or di-lower alkylsulfamoyl, A is O or S, n is 0, 1 or 2 and n' is 0, 1 or 2, and pharmaceutically acceptable acid-addition salts thereof.

The term "lower alkyl" as employed herein includes both straight and branched chain radicals of up to and including eight carbon atoms, for instance, methyl, ethyl, propyl, isopropyl, butyl, s-butyl, isobutyl, pentyl, hexyl, isohexyl, heptyl, 4,4-dimethylpentyl, octyl, 2,2,4-trimethylpentyl and the like.

The term "halogen" includes F, Cl, Br or I.

The lower alkylmercapto groups contain up to eight carbon atoms and include methylmercapto, ethylmercapto, propylmercapto and mercapto radicals containing any of the lower alkyl groups mentioned hereinbefore.

The terms "lower alkyloxy" and "lower alkoxy" are interchangeable and refer to groups containing up to eight carbon atoms and which include any of the lower alkyl groups mentioned hereinbefore attached to an oxygen atom.

The term "cycloalkyl" includes saturated ring systems contain from three to seven carbons such as cyclopropyl, cyclobutyl, cyclopentyl, cyclohexyl and cycloheptyl.

The term "alkenyl" includes mono-unsaturated straight chain or branched chain radicals of less than eight carbon atoms corresponding to "lower alkyl" as defined above.

In the above Formulae I and II, each of the carbocyclic aromatic rings can include 0, 1 or 2 substituents, other than hydrogen. The nature and position of the substituents in the starting materials will determine which isomer, Type I and/or Type II, is obtained.

$R^1$ and $R^2$ may be the same or different and represent hydrogen, lower alkyl, aralkyl and alkenyl; $NR^1R^2$ taken together is a heterocyclic radical having the formula

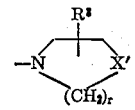

in which X' represents $NR^4$, O, S or $CH_2$, r represents 1, 2 or 3; $R^4$ represents hydrogen, lower alkyl, hydroxy-lower alkyl, lower alkanoyloxy-lower alkyl, hydroxy-lower alkoxy-lower alkyl, di(lower alkyl)amino-lower alkoxy-lower alkyl, lower-alkylamino-lower alkyl, di-lower alkyl amino-lower alkyl, amino-lower alkyl; and $R^3$ represents any of the $R^4$ groups. These may be exemplified by piperidinyl; (lower alkyl)piperidinyl [e.g., 2-, 3- or 4-(lower alkyl)piperidinyl]; (lower alkoxy)piperidinyl; pyrrolidinyl; (lower alkyl)pyrrolidinyl; (lower alkoxy)pyrrolidinyl; piperazinyl; (lower alkyl)piperazinyl (e.g.-, $N^4$-methylpiperazinyl); di(lower alkyl)piperazinyl; lower alkoxy)piperazinyl; (hydroxy-lower alkyl)piperazinyl [e.g., N⁴-(2-hydroxyethyl)piperazinyl]; (lower alkanoyloxyalkyl)piperazinyl [e.g., N⁴-(2-acetoxyethyl)piperazinyl]; (hydroxy-lower alkoxy-lower alkyl)piperazinyl [e.g., N⁴-[2-(2-hydroxyethoxy)ethyl]piperazinyl]; di-(lower alkyl)amino-(lower alkoxy-lower alkyl)piperazinyl [e.g., N⁴-[2 - (2 - dimethylaminoethoxy)ethyl]piperazinyl]; homopiperazinyl; amino(lower alkyl) piperidinyl [e.g., 3-(aminomethyl)piperidinyl], lower alkylamino (lower alkyl)piperidinyl [e.g., 2-[(methylamino)ethyl]piperidinyl], di-lower alkylamino(lower alkyl)piperidinyl [e.g., 4-[(dimethylamino)methyl]piperidinyl].

The salts of the compounds of this invention include the acid-addition salts, particularly the non-toxic acid-addition salts. Acids useful for preparing the acid addition salts, include inter alia, inorganic acids, such as the hydrohalic acids (e.g., hydrochloric and hydrobromic acid), sulfuric acid, nitric acid and phosphoric acid, and organic acids, such as oxalic, maleic, fumaric, tartaric, citric, pamoic, acetic, and succinic acid.

As will be seen hereinafter, the compounds of the invention are prepared from starting materials of the structure (III)
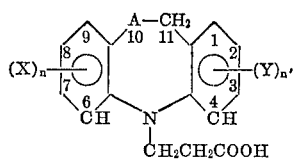
CH₂CH₂COOH Where in the starting material III, $n$ is 1 or 2 and X includes a strongly electronegative group like trifluoromethyl, cyano, isocyanido or di-lower alkylsulfamoyl substituent at the 7-position, and $n'$ is 0, or Y is a substituent at a position other than 3 and 4 in the starting material, cyclization is directed to the 4-position so that the Type II isomer is subsequently formed. However, where X is an ortho-para orienting group like halogen, especially chlorine, and $n$ is 1 or 2 and at least one halogen is at the 7-position of starting material III, or Y is lower alkyl, lower alkyloxy, cycloalkyl or lower alkylmercapto at any position or a strongly electronegative group at a position other than 3, or when $n'$ is 0, a mixture of the Type I and Type II isomers is obtained.

Where in the starting material III, $n'$ is 1 or 2 and Y includes a strongly electronegative group like trifluoromethyl, cyano or di-lower alkylsulfamoyl at the 3-position, and $n$ is 0 or X is a substituent at a position other than 7 in the starting material, cyclization is directed to the 6-position so that the Type I isomer is subsequently formed.

Where in the starting material III, $n'$ is 1 or 2 and Y includes an ortho-para orienting substituent at the 3-position, and $n$ is 0, or X is a substituent at a position other than 7 in the starting material, cyclization is directed to the 6-position so that the Type I isomer is subsequently formed.

Where $n$ and $n'$ are 0, that is where there are no substituents on either aromatic ring, the Type I isomer is obtained, that is (IV)
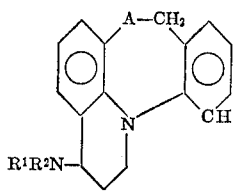

Where the starting material does not include substituents at the 3 and/or 7 positions, but does include substituents such as lower alkyl, lower alkyloxy, cycloalkyl or lower alkylmercapto at the 2, 8 and/or 9 positions, the Type I isomer is obtained.

Where the starting material does not include substituents at the 3 and/or 7 positions, but does include strongly electronegative groups at the 1 and/or 9 positions, the Type I isomer is obtained. However, where the starting material includes a strongly electronegative group at the 2 and/or 8 positions, then a mixture of the Type I and Type II isomers is obtained.

Where X represents a strongly electronegative group like trifluoromethyl, cyano or di-lower alkylsulfamoyl and $n$ is 1 or 2 at least one X being at the 7-position of the starting material and Y is lower alkyl, lower alkylmercapto, cycloalkyl or lower alkoxy at any position or any of the above strongly electronegative groups at a position other than 3 in the starting material and $n$ is 0, 1 or 2, the Type II isomer is obtained.

Where X is lower alkyl, lower alkyloxy, cycloalkyl, or lower alkylmercapto and $n$ is 1 or 2 and Y is halogen, trifluoromethyl, cyano, isocyanido or di-lower alkylsulfamoyl, and $n'$ is 1 or 2, at least one Y being at the 3-position of the starting material, the Type I isomer is obtained. In this case, X can be trifluoromethyl or other strongly electronegative group so long as it is not in the 7-position of the starting material as will be seen hereinafter.

Where X is lower alkyl, lower alkyloxy, cycloalkyl or lower alkylmercapto, and $n$ is 1 or 2 and $n'$ in $(Y)_{n'}$ is 0, the Type I isomer is obtained.

Where Y is lower alkyl, lower alkyloxy, cycloalkyl or lower alkylmercapto and $n'$ is 1 or 2 and the $n$ in $(X)_n$ is 0, the Type II isomer is obtained.

Where both X and Y represent lower alkyl, lower alkoxy and/or lower alkylmercapto, at least one of said groups being at the 3 and 7 positions of the starting material, the Type I isomer is obtained.

Preferred are those compounds of Formula I wherein $n=0$ and $n'=0$ and $A=O$; those compounds of Formula I wherein $n=0$, $n'=1$ and Y is Cl at the 11-position, and $n=1$, $n'=0$ and X is Cl at 4 position and $A=O$ and those compounds of Formula II wherein $n=1$, X is $CF_3$ or Cl at the 1'-position, $n'=0$, and $A=O$.

The compounds of the invention of Formulae I and II can be prepared by reducing an oxime of Formula V or VI

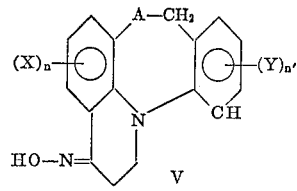

or

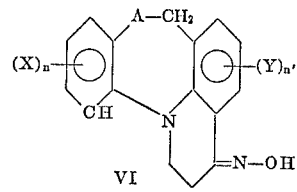

by reacting it with a reducing agent such as lithium aluminum hydride, sodium bis(2-methoxyethoxy)aluminum hydride in a non-protic solvent such as benzene, toluene, xylene, hexane, heptane, cyclohexane, ethyl ether, tetrahydrofuran, dioxane, etc., or with a reducing agent such as sodium amalgam in aqueous alcohol to form the corresponding amine.

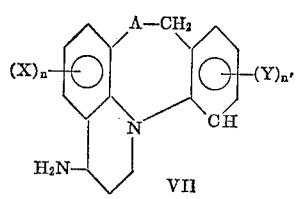

or

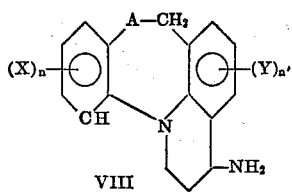

VIII

The 3-amino derivative of structure VII or VIII can then be substituted by reaction with a bis(haloalkylene) derivative of the structure (VIIa)  

wherein r' is 1 to 3 and Hal is Cl or Br, for example, bis(β-chloroethyl)ether, to form the corresponding 1-heterocyclic compound.

Compounds of the Formulae I and II can also be prepared by reducing a 3-one of the structure

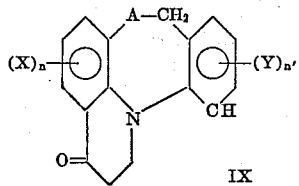

IX or

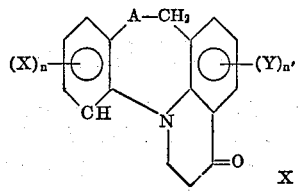

X by reacting it with any of the aforementioned reducing agents, and preferably sodium borohydride, to form the corresponding 3-hydroxy compound of the structure

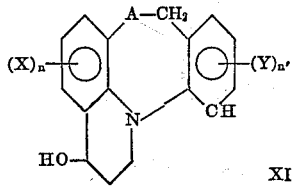

XI or

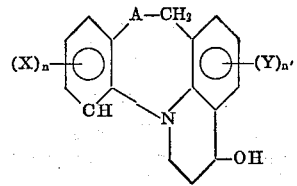

XII which is converted to the corresponding 3-chloro compound by reacting it with anhydrous hydrogen chloride in the presence of an anhydrous chloride salt, such as anhydrous barium chloride, anhydrous zinc chloride, or anhydrous calcium chloride, and a non-protic solvent such as any of those mentioned hereinbefore, to form the corresponding 3-chloro compound of the structure

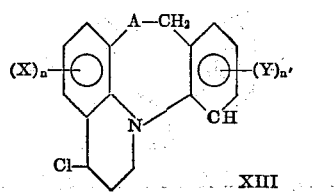

XIII or

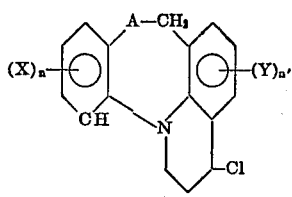

XIV

The 3-chloro compounds of structures XIII and XIV can be converted to amine or heterocyclic compounds of the invention by, for example, reacting it with heterocyclics of the structure XV (XV)  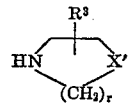

wherein $R^3$, X' and r are as defined hereinbefore, for example, piperazine or a substituted piperazine such as 1-piperazine-ethanol, or piperidine or substituted piperidines to form 3-heterocyclic compounds of the invention.

3-heterocyclic compounds of the invention can also be prepared directly from 3-ones of Formulae IX and X by reacting the 3-one with a heterocyclic of the structure XV wherein $R^3$, X' and r are as defined hereinbefore, in the presence of a catalyst such as p-toluenesulfonic acid under reflux in non-protic solvents such as any of those mentioned hereinbefore to form an enamine compound of the structure

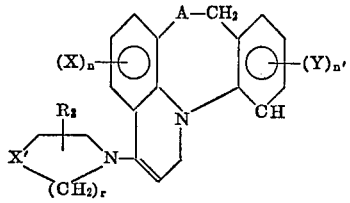

XVI or

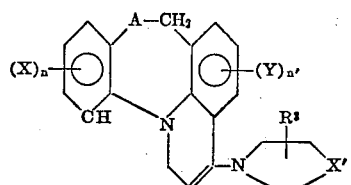

XVII which is then reduced by reacting it with a reducing agent, e.g., sodium borohydride, lithium aluminum hdyride, or sodium bis(2-methoxyethoxy)aluminum hydride to form compounds of the structure

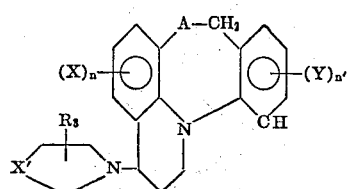

XVIII or

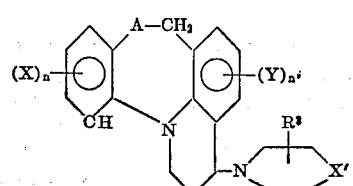

XIX 3-amino compounds of the invention can also be prepared by reacting a 3-one of the structure IX or X with an amine of the structure (XX)          HNR¹R² in the presence of a Friedel-Crafts type of metal halide, e.g., titanium tetrachloride, stannic chloride, aluminum chloride, zirconium chloride or bismuth bromide to form a compound of the structure

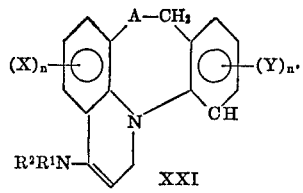

or

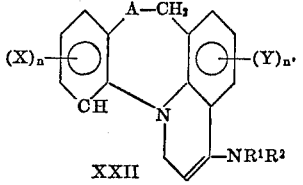

which can be reduced with any of the aforementioned reducing agents to form compounds of the structure

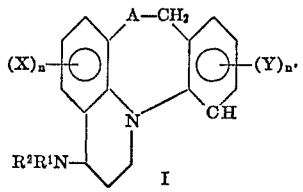

or

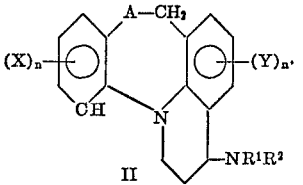

The 3-one starting materials of the invention can be prepared by reacting a compound of the structure (III) 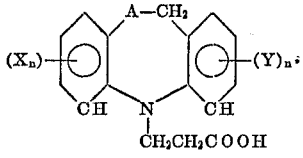

wherein X, Y, $n$, $n'$, and A are as defined hereinbefore, with a phosphorus pentahalide, such as phosphorus pentachloride, in a molar ratio of III:pentahalide of within the pperature within the range of from about 0 to about 10° C., oxygen, and in the presence of an inert solvent, such as benzene, toluene, xylene, pentane, hexane, etc., at a temperature wtihin the range of from about 0 to about 10° C., to form an acyl halide of the structure

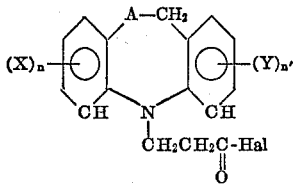

(XXIII)

The acyl halide XXIII is reacted with anhydrous stannic chloride in a molar ratio of acyl halide XXIII:stannic chloride within the range of from about 0.4:1 to about 1:1, at a temperature within the range of from about 20° to about 30° C. to form the Formula IX and X, 3 or 3'-one compounds depending upon the nature and the position of the X and Y substituents.

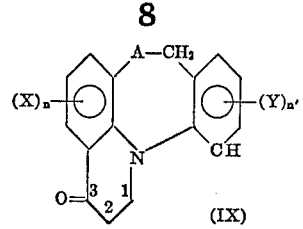

or

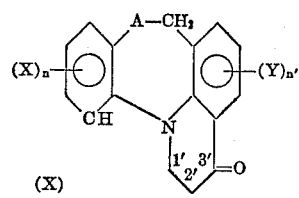

The compounds of Formula IX and/or X can also be prepared by reacting the starting material

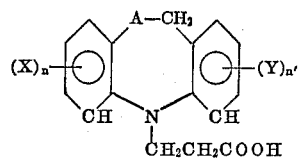

(III)

with trifluoroacetic anhydride or phosphorus pentoxide, in a molar ratio of III:trifluoroacetic anhydride, or phosphorus pentoxide of within the range of from about 0.9:1 to about 1:1, in the presence of an inert solvent such as benzene, toluene, xylene, pentane, hexane, etc., at a temperature within the range of from about 10° to about 80° C., or with polyphosphoric acid (PPA) in a molar ratio of III:PPA of within the range of from about 1:10 to about 1:25.

The ketones of Formulae IX and X react with hydroxylamine or the hydrohalide salt thereof in the presence of a solvent such as ethanol, methanol, etc., to give the corresponding oxime starting materials, that is

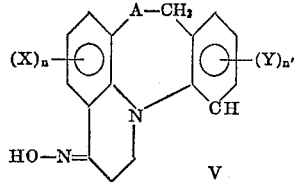

or

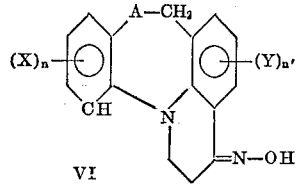

The starting materials of Formula III are prepared by a sequence of reactions. One step comprises reacting compounds having the Formula XXIV:

(XXIV) 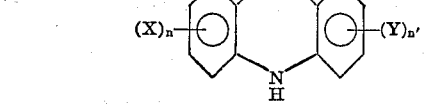

with acrylonitrile to yield compounds of Formula XXV (XXV) 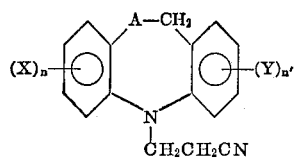

wherein $n$, $n'$ X, Y and A are as defined herein.

This reaction is carried out by employing an excess of the acrylonitrile as the solvent. The temperature utilized in the reaction can be varied from about 0° to about 100° C. with the preferred range being between about 0° and about 75° C. This reaction proceeds expeditiously when a small amount (up to about 1%) of a strong base like sodium hydroxide, sodium methoxide, potassium t-butoxide, or benzyl trimethylammonium hydroxide (Triton B) is used as the catalyst.

The next step for preparing compounds of Formula III is to treat the compounds of structure XXV with alcoholic hydrogen halide, such as hydrogen chloride in methanol, ethanol, and so forth, at room temperature whereby esters of the structure XXVI are formed.

(XXVI)
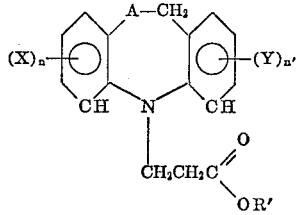

wherein R' is lower alkyl.

By saponifying compound XXVI with an alkali metal hydroxide, e.g., sodium hydroxide, lithium hydroxide, and so forth, the desired carboxylic acids of structure III can be recovered.

Examples of compounds of Formula XXIV where A is S are set out in U.S. Pats. Nos. 3,188,321 and 3,188,322.

Examples of compounds of Formula XXV where A is O or S can be found in a paper entitled Novel Polycyclic Heterocycles, by Yale et al., J. Med. Chem. 13, 713 (1970).

Examples of starting materials which can be employed in preparing the compounds of the invention include, but are not limited to, the following wherein A can be O or S.

(1)
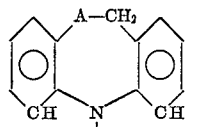

(2)
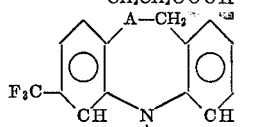

(3)
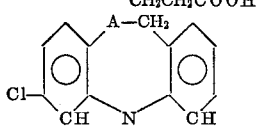

(4)
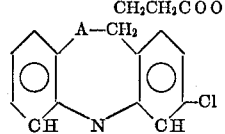

(5)
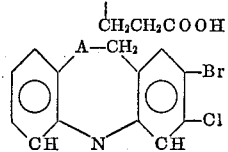

(6)
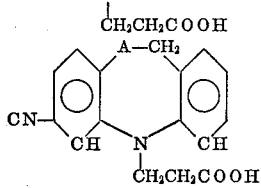

(7)
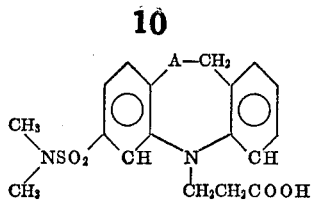

(8)
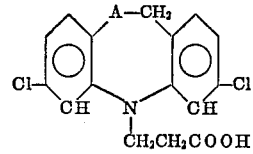

(9)
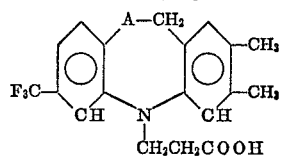

(10)
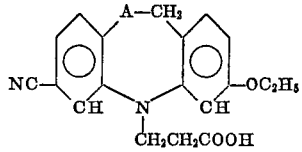

(11)
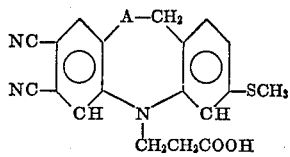

(12)
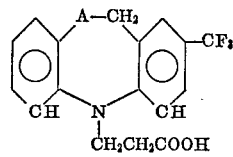

(13)
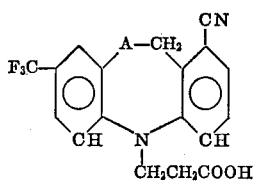

(14)
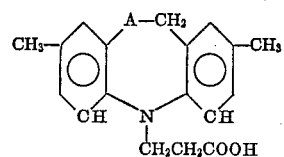

(15)
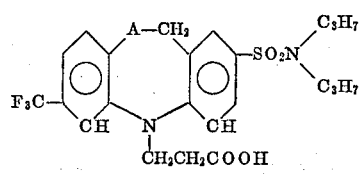

(16)
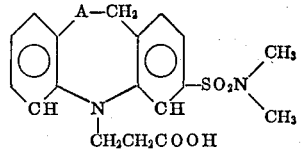

(17)
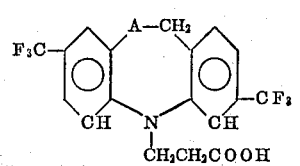

(18) 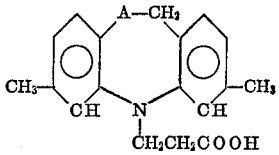

(19) 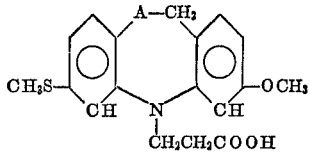

(20) 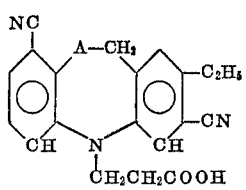

(21) 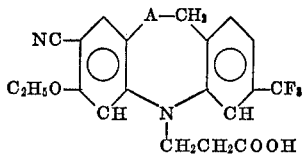

(22) 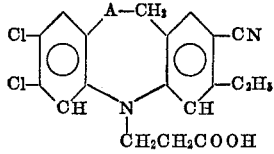

(23) 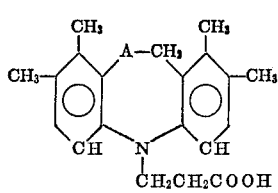

Compounds of this invention are therapeutically active compounds which are utilizable as central nervous system stimulants, as muscle relaxants and as antiinflammatory agents. For these purposes, they may be administered orally or parenterally in such form as tablets, capsules, injectables, or the like by incorporating the appropriate dosage of the compound with carriers according to accepted pharmaceutical practices.

The new compounds of Formulae I and II are also useful as antimicrobial agents and may be used to combat infections in animal species, such as mice, rats, dogs, guinea pigs and the like, due to organisms such as *Trichomonas vaginalis, Trichomonas foetus, Staphyloccocus aureus, Salmonella schottmuelleri, Klebsiella pneumoniae, Proteus vulgaris, Escherichia coli, C. albicans* or *Trichophyton mentagrophytes*. For example, a compound or mixture of compounds of Formulae I and II may be administered orally to an infected animal, e.g., to a mouse, in an amount of about 5 to 25 mg. per kg. per day in 2 to 4 divided doses. These may be conventionally formulated in a tablet, capsule or elixir containing about 10 to 250 mg. per dosage unit, by compounding the active substance or substances with the conventional excipient, vehicle, binder, preservative, flavor, etc., as called for by accepted pharmaceutical practice. They may also be applied topically, e.g., to dermatophytosis in a guinea pig, in a lotion, salve or cream at a concentration of about 0.01 to 3 percent by weight.

They may also be used as surface disinfectants. About 0.01 to 1 percent by weight of any of these substances may be dispersed on an inert solid or in a liquid such as water and applied as a dust or spray. They may be incorporated also, for example, in a soap or other cleansing agent, e.g., a solid or liquid detergent, detergent composition, for example, in general cleaning, in cleaning dairy barns or equipment or cleaning food handling or processing equipment.

EXAMPLE 1

2,3 - dihydro - 3 - [4-(2-hydroxyethyl)-1-piperazinyl]- 11 - (trifluoromethyl) - 1$\underline{H}$,7$\underline{H}$ - quino[8,1-cd][1,5] benzoxazepine maleate salt (A) 5,11 - dihydro - 7 - (trifluoromethyl)dibenz[b,e] [1,4]oxazepine-5-propionic acid.—To 50.0 g. of 5,11-dihydro - 7 - (trifluoromethyl)dibenz[b,e][1,4]oxazepine in 60 ml. of redistilled acrylonitrile is added in 5 minutes 0.80 ml. of Triton B. Subsequently, the mixture is heated for one hour under reflux and the product isolated by extraction with benzene to give 5,11 - dihydro - 7 - (trifluoromethyl)dibenz[b,e][1,4]oxazepine-5 - propionitrile, M.P. about 161–163°.

7 - (trifluoromethyl) - 5,11 - dihydrodibenz[b,e][1,4] oxazepine - 5 - propionitrile, 15.0 g., is dissolved in 240 ml. of dry dioxane and to this 140 ml. of 30% methanolic hydrogen chloride is added. The solution is stirred for 36 hours; 6 ml. of H$_2$O is added, stirred 0.5 hour, and then concentrated in vacuo to 120 ml. The solid is filtered, and the filtrate is concentrated to dryness in vacuo. The residual liquid is taken up in 200 ml. of diethyl ether, treated with Darco and Hyflo, the diethyl ether solution concentrated and the residue distilled in vacuo to give 5,11 - dihydro - 7 - (trifluoromethyl)dibenz[b,e][1,4] oxazepine-5-propionic acid, methyl ester, B.P. about 166–168° (0.08 mm.), M.P. about 70.0–71.5°.

7 - (trifluoromethyl) - 5,11 - dihydrodibenz[b,e][1,4] oxazepine-5-propionic acid, methyl ester, 3.15 g., is dissolved in 315 ml. of methanol and to this 0.5 g. of potassium hydroxide dissolved in 25 ml. of water is added. The mixture is refluxed for 2.5 hours and then concentrated in vacuo. The residue is taken up in 250 ml. of water and this solution is acidified with 2% aqueous HCl to give 5,11-dihydro-7-(trifluoromethyl)dibenz[b,e][1,4] oxazepine-5-propionic acid, M.P. about 94–96°.

(B) 1,2-dihydro - 11 - (trifluoromethyl)-3$\underline{H}$,7$\underline{H}$-quino [8,1-c.d][1,5]-benzoxazepin-3-one.—A solution of 6.86 g. of 5,11 - dihydro-7-(trifluoromethyl)dibenz[b,e][1,4]oxazepine-5-propionic acid in 50 ml. of benzene is cooled to 5–10°. To this is added dropwise with stirring a solution of 4.6 g. of PCl$_5$ in 25 ml. of benzene over a period of 15 minutes. The solution is stirred at 25° for 40 minutes and then at 40–50° for another 20 minutes. The reaction mixture is then heated at 55° for 10 minutes, cooled to 10° and to this is added dropwise with stirring a solution of 12.0 g. anhydrous stannic chloride in 20 ml. of benzene. After stirring 20 minutes at 10° and 20 minutes at room temperature, 100 ml. of ether are added, followed by 10 ml. of concentrated hydrochloric acid, and then 100 ml. of water. After stirring vigorously for 10 minutes, the organic phase is separated, and the aqueous phase is extracted with 100 ml. of ether. The combined organic extracts are washed, dried, filtered, and concentrated to dryness to give 6.9 g. of residue; this is crystallized from 2-propanol to give 4.3 g. of product, M.P. about 140–142°.

(C) 2,3-dihydro - 11 - (trifluoromethyl-1$\underline{H}$,7$\underline{H}$-quino-[8,1-cd][1,5]benzoxazepin-3-ol.—A solution of 9.6 g. of of 1,2-dihydro-11-(trifluoromethyl)-3$\underline{H}$,7$\underline{H}$-quino[8,1-cd] [1,5]benzoxazepin-3-one in 200 ml. of dioxane is cooled to 10°, and to this is added a cold solution of 1.2 g. of sodium borohydride in 60 ml. of 25% aqueous dioxane, within 3 minutes. After the addition, the reaction mixture is stirred for 1 hour at room temperature, and then heated on a steam bath. When the temperature reaches 60–65°, the color of the reaction mixture fades and becomes colorless. It is cooled to 10° and to this is added 1000 ml. of cold 2% aqueous hydrochloric acid while stirring. The resultant white solid is filtered, washed with 200 ml. of water, and dried to give 9.3 g. of an off-white solid, M.P. about 120–124°. It is recrystallized twice from a mixture of 50 ml. of benzene and 150 ml. of cyclohexane, to give 8.6 g. of the desired carbinol, which melts at about 127–129°.

(D) 3-chloro-2,3-dihydro-11-(trifluoromethyl) - 1H,7H-quino[8,1-cd][1,5]benzoxazepine.—To a solution of 6.0 g. of 2,3 - dihydro - 11 - (trifluoromethyl)-1H,7H-quino[1,8-cd][1,5]benzoxazepin-3-ol, in 10 ml. of benzene is added 4.0 g. of anhydrous calcium chloride and into this is slowly bubbled dry hydrogen chloride. The mixture is filtered and the filtrate is concentrated to dryness under reduced pressure to give 5.86 g. of solid, M.P. 115–118°.

When this solid, 1.6 g., is dissolved in a mixture of 120 ml. of petroleum ether (30–60°) and 6 ml. of absolute ethanol and cooled, there is obtained 1.25 g. of product, M.P. about 122–124° (dec.).

(E) 2,3 - dihydro-3-[4-(2-hydroxyethyl)-1-piperazinyl]-11-(trifluoromethyl) - 1H,7H - quino[1,8-cd][1,5]benzoxazepine, maleate salt (1:2).—To a solution of 4.1 g. of 3-chloro-2,3-dihydro - 11 - (trifluoromethyl)-1H,7H-qino[1,8-cd][1,5]benzoxazepine in 30 ml. of chloroform is added a solution of 3.3 g. of 1-piperazineethanol in 30 ml. of chloroform. The reaction mixture is refluxed for 7 hours while stirring and then is concentrated to dryness in vacuo. To the residue is added 200 ml. of distilled water, and the whole is extracted with 1–100 ml. and 2–50 ml. portions of benzene. The combined benzene extracts are washed with 100 ml. of water and then extracted into 2–100 ml. portions of 5% aqueous hydrochloric acid. The combined acid extracts are cooled, made alkaline, and extracted with 1–150 ml. and 2–50 ml. portions of benzene. The combined benzene extracts are washed, dried and the solvent is removed in vacuo to give about 2.5 g. of residue. This is dissolved in 15 ml. of boiling ethanol and to this is added a solution of 1.7 g. of maleic acid in 10 ml. of boiling ethanol, and cooled. The crystalline solid is filtered and dried to give about 3.4 g. of a solid, M.P. 147–154° (dec.). This is recrystallized first from ethanol and then from acetonitrile to give 2.5 g. of product, M.P. about 161–163° (dec.).

EXAMPLE 2

2,3 - dihydro-3-(4 - methylpiperazinyl)-11-(trifluoromethyl)-1H,7H-quino[1,8-cd][1,5]benzoxazepine, maleate salt (A) 1,2-dihydro - 11 - (trifluoromethyl)-3H,7H-quino[8,1-cd][1,5]benzoxazepine-3-one.—To a solution of 64.0 g. of 5,11-dihydro - 7 - (trifluoromethyl)dibenz[b,e][1,4]oxazepine-5-propionic acid in 300 ml. of anhydrous benzene, is added dropwise 28.2 ml. of (CF$_3$CO)$_2$O while stirring. The reaction mixture is slowly heated to reflux temperature and the reflux is maintained for 15 minutes. The solution is then poured into 2600 ml. of cold water and to this 600 ml. of benzene is added while stirring. The benzene layer is separated and the aqueous phase is extracted once with 200 ml. of benzene. The combined benzene extracts are washed, dried, and filtered. The solvent is removed under reduced pressure to give 62.0 g. of yellow solid, which is crystallized twice from 2-propanol to give 50.5 g. of a bright yellow crystalline product, M.P. about 142–143.5°.

(B) 3-(4-methylpiperazinyl) - 11 - (trifluoromethyl)-1H,7H-quino[8,1-cd][1,5]-benzoxazepine.—To a suspension of 14.4 g. of 1,2-dihydro-11-(trifluoromethyl)-3H,7H-quino[8,1-cd][1,5]benzoxazepin-3-one in 100 ml. of toluene are added 10.0 g. of freshly distilled N-methyl-piperazine and 0.5 g. of p-toluenesulphonic acid and the reaction mixture is heated under reflux for 5 days using a Dean-Stark water separator; 0.65 ml. of water separates. An additional 10 g. of N-methylpiperazine is added and reflux is continued for another 6 days; a total of 1.0 ml. of water separates. The solvent is removed by distillation under reduced pressure. The residue is dissolved in hexane, filtered and the filtrate is concentrated to 400 ml., when a colorless crystalline solid separates. This is filtered to give 14.0 g. of a solid; 4.0 g. of this is recrystallized from hexane to give 2.5 g. of the above titled enamine, M.P. about 179–181°.

(C) 2,3 - dihydro - 3 - (4 - methylpiperazinyl)-11-(trifluoromethyl) -1 H,7H - quino[8,1-cd][1,5]benzoxazepine, maleate salt (1:2).—To a solution of 10.0 g. of the above enamine in 500 ml. of anhydrous tetrahydrofuran is added, while stirring, 8.0 g. of sodium borohydride all at once followed by the dropwise addition of 50 ml. of acetic acid, during a period of 2 hours. This is then stirred for 2.5 hours and 35–40° and then for 0.5 hour at 55–60°, concentrated to 150 ml., cooled and 150 ml. of water is added. This is made strongly alkaline and extracted with ether. The ether extracts are washed, dried, filtered and the solvent is removed. The residue is dissolved in 50 ml. of 2-propanol and to this, a solution of 5.0 g. of maleic acid in 20 ml. of absolute ethanol is added; the solution is cooled and the resulting solid is filtered to give the crude dimaleate salt, M.P. about 154–156° (dec.). This is recrystallized from 2-propanol and from ethanol to give 6.2 g. of dimaleate salt, M.P. about 160–162° (dec.).

EXAMPLE 3

2, 3 - dihydro - 3 - (1-pyrrolidinyl)-11-(trifluoromethyl)-1H,7H - quino[8,1 - cd][1,5]benzoxazepine, maleate salt A solution of 8.6 g. of 1.2-dihydro-11-trifluoromethyl)-1H,7H-quino[8,1-cd][1,5]benzoxazepin - 3-one prepared as described in Example 2(A), 4.5 ml. of freshly distilled pyrolidine and 0.2 g. of p-toluenesulphonic acid in 65 ml. of benzene is heated under reflux for 4 hours using a Dean-Stark water separator. The mixture is cooled, 4.5 ml. of additional pyrrolidine is added and the reflux is continued for 15 hours, during which period 0.7 ml. of water separates. The solution is concentrated in vacuo to give a solid, which is dissolved in 300 ml. of boiling hexane and the solution cooled to give the enamine, M.P. 138–141°. The enamine, 6.5 g., is reduced with sodium borohydride as described in Example 2(C) and the product is isolated as a maleate salt, M.P. about 183–185° (dec.).

EXAMPLE 4

2,3 - dihydro - 3 - (1-piperazinyl)-11-(trifluoromethyl)-1H,7H-quino[8,1-cd][1,5]benzoxazepine, maleate salt (1:2)

A mixture of 6.4 g. of 1,2-dihydro-11-(trifluoromethyl)-1H,7H-quino[8,1-cd][1,5]benzoxazepin-3-one, as prepared in Example 2(A), 6.9 g. of anhydrous piperazine and 0.3 g. of p-toluene-sulphonic acid in 120 ml. of toluene is heated for 7 days under reflux with azeotropic removal of water using a Dean-Stark apparatus. The solvent is removed in vacuo and the residue heated at about 70° at 0.4 mm. The residue, 6.0 g. is dissolved in 250 ml. of tetrahydrofuran and to this is added 4.0 g. of sodium borohydride, followed by the dropwise addition of 30 ml. of glacial acetic acid. The reaction mixture is concentrated to 120 ml., diluted with 150 ml. of water, cooled, made alkaline with 40% sodium hydroxide, and extracted with 2–100 ml. and 1–50 ml. portions of ether. The combined extracts are washed, dried and concentrated in vacuo to give 3.0 g. of residue. This is dissolved in 15 ml. of 2-propanol and the solution is added to a solution of 2.0 g. of maleic acid in 10 ml. of 2-propanol, and to this is added anhydrous ether to slight turbidity and cooled to give 2.2 g. of a white solid, M.P. about 143–146° (dec.). This is recrystallized from 20 ml. of acetonitrile to give about 1.1 g. of product, M.P. about 148–150° (dec.).

EXAMPLE 5

3 - (dimethylamino) - 2,3 - dihydro-11-(trifluoromethyl)-1H,7H - quino[8,1 - cd][1,5]benzoxazepine, maleate (1:1)

To a solution of 8.0 g. of 1,2-dihydro-11-(trifluoromethyl) - 1H,7 - amino[8,1-cd][1,5]benzoxazepin - 3-one as prepared in Example 2(A) in 400 ml. of anhydrous ether is added 50 ml. (0.17 mole) of a 20% solution of dimethylamine in anhydrous ether. The mixture is cooled to −5° and to it is added dropwise, during a period of 5 minutes, a solution of 1.5 ml. of titanium tetrachloride in 30 ml. of benzene. The reaction mixture is stirred at room temperature for 3 days, filtered and the solvent is removed. The residue, 8.4 g., is dissolved in 300 ml. of anhydrous tetrahydrofuran. To this, while stirring at room temperature, 5.0 g. of sodium borohydride is added, followed by the dropwise addition of 35 ml. of glacial acetic acid during a period of 1.5 hours. The temperature rises to 40°, and the reaction mixture becomes colorless. After stirring overnight at room temperature, the mixture is concentrated to 150 ml. and to it, is added 150 ml. of water. This is cooled, an excess of 50% sodium hydroxide added, and extracted with ether. The combined ether extracts are washed, dried and concentrated. The residual liquid, 8.1 g., is dissolved in 100 ml. of acetonitrile and to this is added a hot solution of 3.0 g. of maleic acid in 50 ml. of acetonitrile and cooled. The crystalline solid is filtered to give 3.2 g., M.P. about 190–192° (dec.). The filtrate on concentration and addition of ether gives an additional 2.9 g. of solid, M.P. 184–187°. The combined solids, 5.9 g., are recrystallized from a mixture of 2-propanol and absolute ethanol to give 4.3 g. of the product, M.P. 190–192° (dec.).

EXAMPLE 6

3-amino-2,3-dihydro-11-(trifluoromethyl)-1H,7H-quino-[8,1-cd][1,5]benzoxazepine, hydrochloride (A) 1,2 - dihydro - 11-(trifluoromethyl)-3H,7H-quino-[8,1-cd][1,5-]benzoxazepin-3-one, oxime.—A solution of 28.0 g. of 1,2-dihydro-11-(trifluoromethyl)-3H,7H-quino-[8,1-cd][1,5]benzoxazepin-3-one from Example 2(A), and 13.6 g. of hydroxylamine hydrochloride in 600 ml. of warm 70% ethanol is refluxed for 4 hours, and kept at room temperature to give a pale yellow crystalline solid. This is filtered and recrystallized from 70% ethanol to give 21.0 g. of the oxime, M.P. about 98–200° (dec.).

(B) 3-amino-2,3-dihydro-11-(trifluoromethyl)-1H,7H-quino[8,1-cd][1,5]benzoxazepine, hydrochloride.—To a suspension of 4.0 g. of 1,2-dihydro-11-(trifluoromethyl)-3H,7H-quino[8,1-cd][1,5]benzoxazepin-3-one, oxime in 280 ml. of warm absolute ethanol is added, while stirring, 62.0 g. of 5% sodium amalgam in four portions; 3.8 ml. of glacial acetic acid is also added simultaneously, dropwise. The reaction mixture is stirred for 1 hour at room temperature, and then 200 ml. of water is added. The mixture is extracted with 2–250 ml. portions of ether; the extracts are washed, dried, filtered and the solvent removed under reduced pressure. The pale yellow residue, 3.8 g., is recrystallized from hexane to give about 1.4 g. of the product as the base, M.P. about 73–75°. The base, 1.3 g., is dissolved in 75 ml. of anhydrous ether and to this is added 15 ml. of 3.24 N ethereal hydrogen chloride. The solid is filtered, and dried and is found to melt at 225–231° (dec.). This is recrystallized from 60 ml. of 2-propanol to give about 1.2 g. of the hydrochloride, M.P. about 229–231°.

EXAMPLE 7

2,3 - dihydro-3-(1-morpholino)-11-(trifluoromethyl)-1H, 7H - quino[8,1 - cd][1,5]benzoxazepine, maleate salt (1:1)

To a solution of 12.6 g. of 3-amino-2,3-dihydro-11-(trifluoromethyl) - 1H,7H-quino[8,1-cd][1,5]benzoxazepine prepared as in Example 6(B) and 7.4 g. of bis(β-chloroethyl)ether in 100 ml. of xylene, is added 14.0 g. of anhydrous potassium carbonate and the mixture heated under reflux for 16 hours, cooled and filtered. The filtrate is washed, dried and then concentrated in vacuo. The viscous residue, 14.1 g. is dissolved in 200 ml. of acetonitrile and to this, is added a solution of 4.6 g. maleic acid in 20 ml. of warm acetonitrile; the mixture is cooled and the solid filtered to give 12.8 g. of material which is recrystallized from 450 ml. of 2-propanol to give 9.7 g. of the product.

EXAMPLE 8

3-amino-11-chloro-2,3-dihydro-1H,8H-quino[1,8-ab][4,1]benzothiazepine (A) 3-chloro-5,11-dihydrodibenzo[b,e][1,4]thiazepine-5-propionic acid.—A suspension of 24.6 g. of 3-chloro-5, 11 - dihydrodibenzo[b,e][1,4]thiazepine in 55 ml. of acrylonitrile is cooled to 0–5°. To this is added dropwise 0.3 ml. of Triton B. The temperature rises slowly from 3° to 14° and then rapidly to 45° within 5 minutes with the formation of red colored clear solution. The mixture is cooled to 5–10°, stirred for 5 minutes, allowed to come to room temperature and then heated under reflux for 1.5 hours. The excess of acrylonitrile is removed in vacuo; the residue is extracted with 3–350 ml. portions of diethyl ether; the combined ether extracts are decolorized and concentrated to give 31.6 g. of 3-chloro-5,11-dihydrodibenzo[b,e][1,4]thiazepine - 5 - propionitrile, B.P. about 205–210° (0.2 mm.).

To the 3-chloro-5,11 - dihydrodibenzo[b,e][1,4]thiazepine-5-propionitrile, 71.1 g., in 1200 ml. of dry dioxane is added 800 ml. of 30% methanolic hydrogen chloride. The solution is stirred for 72 hours; 30 ml. of water is added; the mixture is stirred for 0.5 hour, concentrated in vacuo to about 400 ml., filtered, and the filtrate concentrated to dryness in vacuo. The residue solidifies on keeping to yield methyl 3-chloro-5,11-dihydrodibenzo [b,e][1,4]thiazepine-5-propionate.

To the methyl 3-chloro-5,11-dihydrodibenzo[b,e][1,4] thiazepine-5-propionate, 25.4 g., in 2200 ml. of methanol is added a solution of 5.6 g. of potassium hydroxide in 300 ml. of water. The mixture is heated under reflux for 4 hours, and then is concentrated in vacuo. The residue is taken up in 600 ml. of water, cooled, and then acidified with 2% aqueous hydrochloric acid. The solid is filtered and recrystallized from benzene to yield 3-chloro-5,11-dihydrodibenzo[b,e][1,4]thiazepine-5-propionic acid.

(B) 11-chloro-1,2-dihydro-3H,8H-quino[1,8-ab][4,1]-benzothiazepine-3-one. — 3-chloro-5,11-dihydro[b,e][1,4] thiazepine-5-propionic acid, 3.7 g., is dissolved in 20 ml. of benzene and to the solution at 20° is added dropwise, 2.8 g. of trifluoroacetic anhydride. The reaction mixture is heated under reflux for 5 minutes, poured into 250 ml. of cold water, and extracted with 150 ml. of benzene. The benzene solution is concentrated to dryness, and the residue is recrystallized from 2-propanol to give about 2.3 g. of product.

(C) 11-chloro-1,2-dihydro-3H,8H-quino[1,8 - ab][4,1] benzthiazepin-3-one, oxime.—A solution of 28.0 g. of 11 - chloro - 1,2-dihydro-3H,8H-quino[1,8-ab][4,1]benzthiazepin-3-one and 13.6 g. of hydroxylamine hydrochloride in 600 ml. of warm 70% ethanol is refluxed for 4 hours, and kept at room temperature to give a pale yellow crystalline solid. This is filtered and recrystallized from 70% ethanol to give 21.0 g. of the oxime.

(D) 3-amino-11-chloro-2,3-dihydro-1H,8H-quino[1,8-ab][4,1]benzothiazepine.—To 46 ml. of a 70% solution of sodium bis(2-methoxyethoxy)aluminum hydride in benzene is added in 0.5 hour 10.4 g. of 11-chloro-1,2-dihydro - 3H,8H-quino[1,8-ab][4,1]-benzothiazepin-3-one, oxime in 500 ml. of anhydrous ether. The mixture is stirred for three days at 20° and then at 35° for 5 hours. To the reaction mixture is added dropwise, 25 ml. of water, followed by 25 ml. of 40% aqueous sodium hydroxide; the organic layer is separated and extracted with 2–200 ml. portions of 5% hydrochloric acid. The aqueous acid extracts are cooled and made alkaline. The semisolid that separates is extracted with 2–125 ml. portions of ether and the combined extracts are concentrated to give about 4.2 g. of pale yellow solid. This is recrystallized from hexane to give the product.

EXAMPLE 9

11 - chloro - 2,3 - dihydro - 3 - [4 - methyl - 1 - piperazinyl] - 1H,8H - quino - [1,8 - ab][4,1] - benzothiazepine, dihydrochloride

Following the procedure described in Example 7, but using 7.2 g. of 3 - amino-11-chloro-2,3-dihydro-1H,8H-quino-[1,8-ab][4,1]benzothiazepine, 3.9 g. of bis(β-chloroethyl)methylamine, 80 ml. of xylene and 14.0 g. of anhydrous potassium carbonate, there is obtained about 9.7 g. of viscous oil. This is dissolved in 100 ml. of 2-propanol and to the solution, with cooling, is added 20 ml. of 4.8 N 2-propanolic hydrogen chloride to give 9.6 g. of solid. This is recrystallized from 2-propanol to give 11-chloro - 2,3 - dihydro - 3 - [4-methyl-1-piperazinyl]-1H, 8H - quino[1,8-ab][4,1]benzothiazepine dihydrochloride.

EXAMPLE 10

4 - chloro - 2,3 - dihydro - 3 - [4 - (2 - hydroxyethyl)- 1 - piperazinyl] - 1H,8H - quino[1,8-ab][4,1]benzoxazepine dimaleate

(A) 4 - chloro - 1,2 - dihydro - 3H,8H-quino[1,8-ab] [4,1]benzoxazepin-3-one.—To a suspension of 17.4 g. of 7-chloro-5,11-dihydrodibenz[b,e][1,4]oxazepine in 35 ml. of acrylonitrile, cooled to 0–5°, is added with stirring 0.2 ml. of Triton B. The suspension becomes homogeneous, the temperature rises to 10°, and a red solution results. This is allowed to come to 20° and is then heated under reflux for one hour. The excess of acrylonitrile is removed by distillation and the residue is extracted with 5–400 ml. portions of diethyl ether. The diethyl ether extracts are dried and concentrated to about 250 ml., and the colorless product is filtered. The filtrate is concentrated and the resulting solid is again filtered. The yield of the combined solids, 7 - chloro - 5,11 - dihydrodibenz[b,e][1,4]oxazepine-5-propionitrile, is about 21.5 g, M.P. about 131–132°.

The 7 - chloro - 5,11 - dihydrodibenz[b,e][1,4]oxazepine-5-propionitrile, 71.1 g., is dissolved in 1200 ml. of dry dioxane and to this 800 ml. of 30% methanolic hydrogen chloride is added. The solution is stirred at 20° for 72 hours, 30 ml. of water is added, the mixture is stirred for 0.5 hour, concentrated in vacuo to about 400 ml., filtered, and the filtrate concentrated in vacuo to dryness to yield 67.5 g. of methyl 7-chloro-5,11-dihydrodibenz[b,e] [1,4]oxazepine-5-propionate, M.P. about 70–72°.

The methyl 7-chloro-5,11-dihydrodibenz[b,e][1,4]oxazepine-5-propionate, 25.4 g., is dissolved in 2200 ml. of methanol and to this is added a solution of 5.6 g. of potassium hydroxide in 300 ml. of water. The solution is heated under reflux for 4 hours, concentrated in vacuo, the residue is dissolved in 600 ml. of water, the solution cooled, and then acidified with 2% aqueous hydrochloric acid. The solid is filtered and dissolved in 600 ml. of benzene. This solution is decolorized and then extracted with 600 ml. of 2% aqueous sodium hydroxide solution. The aqueous extract is acidified with 2% aqueous hydrochloric acid. The solid is filtered and recrystallized from benzene. The yield of 7-chloro-5,11-dihydrodibenz[b,e][1,4]oxazepine-5-propionic acid is about 23.0 g., M.P. about 155.0–156.5°.

A solution of 7.35 g. of 7-chloro-5,11-dihydrodibenz-[b,e][1,4]oxazepine-5-propionic acid in 40 ml. of warm benzene is slowly cooled to 35° and while stirring 5.3 g. of trifluoroacetic acid anhydride is added dropwise. The reaction mixture is heated under reflux for 5 minutes, 50 ml. of benzene is added, and the solution is poured into cold water. The benzene layer is separated, the aqueous phase is extracted with 50 ml. of benzene, and the combined residue, 7.0 g., M.P. about 110–120°, is dissolved in 325 ml. of a boiling mixture of 2-propanol and cyclohexane (2:3), and then kept at 20° to give two different types of crystals. These are filtered and the yellow transparent rhombic crystals (compound I) are separated from the darker yellow flat needles (compound II).

Compound I is recrystallized from 2-propanol-cyclohexane (1:4) to give 2.0 g. of 11-chloro-1,2-dihydro-3H, 7H - quino - [8,1-cd][1,5]benzoxazepin-3-one, M.P. about 141–143°.

Compound II is recrystallized from 2-propanol-cyclohexane (1:4) to give about 2.7 g. of 4-chloro-1,2-dihydro-3H,8H[1,8 - ab][4,1]benzoxazepin - 3 - one, M.P. about 141.5–144°.

(B) 4 - chloro - 2,3 - dihydro - 3 - [4-(2-hydroxyethoxyethyl) - 1 - piperazinyl] - 1H,8H-quino[1,8-ab][1,4] benzoxazepine dimaleate.—Following the procedure employed in Example 1, but using 9.1 g. of 4-chloro-1,2-dihydro - 3H,8H - quino[1,8-ab][4,1]benzoxazepin-3-one and 1.2 g. of sodium borohydride, there is obtained 7.3 g. of 4 - chloro - 2,3-dihydro-1H,8H-quino[1,8-ab][4,1] benzoxazepin-3-ol. By the procedure given in Example 1, 5.7 g. of the above benzoxazepin-3-ol is converted to about 6.2 g. of 3,4-dichloro-2,3-dihydro-1H,8H-quino[1, 8-ab][4,1]benzoxazepine.

Following the procedure of Example 1, using 4.0 g. of 3,4 - dichloro - 2,3 - dihydro - 1H,8H-quino-[1,8-ab][4, 1]benzoxazepine, 3.6 g. of 1-(2-hydroxyethoxyethyl)piperazine, and 60 ml. of chloroform, there is obtained 4.1 g. of the dimaleate.

EXAMPLE 11

11-chloro-2,3-dihydro-3-[4-methyl-1-piperidinyl] benzoxazepine dimaleate

Employing the procedure described in Example 2(B) but employing 13.9 g. of 11-chloro-1,2-dihydro-3H,7H-quino[8,1-cd][1,5]benzoxazepin-3-one, 6.8 g. 4-methylpiperidine, 0.5 g. of p-toluenesulphonic acid, and 150 ml. of anhydrous toluene, there is obtained about 11.3 g. of the enamine, 11 - chloro-3-(4-methyl-1-piperidinyl)-1H, 7H-quino[8.1-cd][1,5]benzoxazepine, M.P. about 151–153°. The enamine, 12.8 g., is reduced with 8.6 g. of sodium borohydride in 500 ml. of tetrahydrofuran, following the procedure described in Example 2(C), to give about 5.9 g. of 11 - chloro - 2,3 - dihydro-3-[4-methyl-1-piperidinyl] - 1H,7H - quino[8,1-cd][1,5]benzoxazepine maleate.

EXAMPLE 12

11-cyano-2,3-dihydro-3-(dimethylamino)-1H,7H-quino [8,1-cd][1,5]benzothiazepine maleate

(A) 7-cyano-5,11-dihydrodibenzo[b,e][1,4]thiazepine-5-propionic acid.—To 45.0 g. of 7-cyano-5,11-dihydrodibenzo[b,e][1,4]thiazepine in 60 ml. of acrylonitrile is added 0.80 ml. of Triton B. The mixture is heated for one hour under reflux and the product isolated by extraction with benzene to give 7-cyano-5,11-dihydrodibenzo [b,e][1,4]thiazepine-5-propionitrile.

To 13.7 g. of 7-cyano-5,11-dihydrodibenzo[b,e][1,4] thiazepine-5-propionitrile in 240 ml. of dioxane is added 140 ml. of 30% methanolic hydrogen chloride. The solution is kept for 36 hours, 6 ml. of $H_2O$ is added, and then concentrated in vacuo to about 120 ml., filtered, and the filtrate concentrated in vacuo. The residual liquid is dissolved in 200 ml. of diethyl ether, the ether solution is concentrated and the residue distilled in vacuo to give methyl 7-cyano - 5,11 - dihydrodibenzo[b,e][1,4]thiazepine-5-propionate, B.P. about 176–178° (0.08 mm.).

To methyl 7 - cyano - 5,11-dihydrodibenzo[b,e][1,4] thiazepine-5-propionate, 2.90 g., in 315 ml. of methanol, is added 0.5 g. of potassium hydroxide in 25 ml. of water. The mixture is refluxed for 2.5 hours and then concentrated in vacuo. The residue is dissolved in 250 ml. of water and treated with an excess of 2% aqueous hydrochloric acid to give 7-cyano-5,11-dihydrodibenzo[b,e] [1,4]thiazepine-5-propionic acid.

(B) 11 - cyano-1,2-dihydro-3H,7H-quino[8,1-cd][1,5] benzothiazepin-3-one.—To 6.33 g. of 7-cyano-5,11-dihydrodibenzo[b,e][1,4]thiazepine-5 - propionic acid in 50 ml. of benzene at 5–10° is added 4.6 g. of phosphorus pentachloride in 25 ml. of benzene during 15 minutes.

The solution is stirred at 25° for 40 minutes, at 40–50° for 20 minutes, at 55° for 10 minutes, cooled and treated dropwise with 12.0 g. of anhydrous stannic chloride in 20 ml. of benzene. After stirring 20 minutes at 10° and 20 minutes at 20°, 100 ml. of ether are added, then 10 ml. of concentrated hydrochloric acid, and then 100 ml. of water. After stirring for 10 minutes, the organic phase is separated, the aqueous phase is extracted with 100 ml. of ether and the combined organic extracts are concentrated. The residue is recrystallized from 2-propanol to give about 4.3 g. of product.

(c) 11 - cyano-2,3-dihydro-3-(dimethylamino)-1H,7H-quino[8,1 - cd][1,5]benzothiazepine maleate.—Following the procedure given in Example 5, but employing 7.8 g. of 11 - cyano - 1,2-dihydro-1H,7H-quino[8,1-cd][1,5]benzothiazepin-3-one, 400 ml. of anhydrous ether, 50 ml. of a 20% solution of dimethylamine in anhydrous ether, and 1.5 ml. of anhydrous titanium tetrachloride, 6.9 g. of the intermediate enamine, 11-cyano-3-(dimethylamino)-1H,7H-quino[8,1-cd][1,5]benzothiazepine, is obtained. The enamine, 6.9 g. in 250 ml. of tetrahydrofuran, is treated with 4.8 g. of sodium borohydride, as in Example 5, to give 3.2 g. of the maleate.

EXAMPLES 13 TO 26

Employing the procedures described in Examples 1(A), 1(B), but substituting the starting material shown in column A of Table I below, the 3-one in column B is obtained; by reacting the 3-one with the heterocyclic compound shown in column C as per Examples 2(B), 2(C), the product shown in column D is obtained.

TABLE I

| Ex. No. | Column A<br>Starting material | Column B<br>3 or 3'-one | Column C | Column D<br>Product |
|---|---|---|---|---|
| 13 | (structure) | (structure) | (structure) | (structure) |
| 14 | (structure) | (structure) | (structure) | (structure) |
| 15 | (structure) | (structure) | (structure) | (structure) |

TABLE I—Continued

| Ex. No. | Column A Starting material | Column B 3 or 3'-one | Column C | Column D Product |
|---|---|---|---|---|
| 16 | | | | |
| 17 | | | | |
| 18 | | | | |
| 19 | | | | |
| 20 | | | | |

3,784,548

TABLE I—Continued

| Ex. No. | Starting material (Column A) | 3 or 3'-one (Column B) | Column C | Product (Column D) |
|---|---|---|---|---|
| 21 | [structure] | [structure] | [structure with R₃, X', (CH₂)ᵣ, piperazine N-CH₂CH₂OH] | [structure] |
| 22 | [structure] | [structure] | [piperidine] | [structure] |
| 23 | [structure] | [structure] | [thiomorpholine] | [structure] |
| 24 | [structure] | [structure] | [piperazine NH] | [structure] |
| 25 | [structure] | [structure] | [morpholine] | [structure] |

TABLE I—Continued

| Ex. No. | Column A<br>Starting material | Column B<br>3 or 3'-one | Column C | Column D<br>Product |
|---|---|---|---|---|
| 26 | [structure: S-CH₃ / Br / CH / N-CH₂CH₂COOH / CH phenyl system] | [structure: S-CH₃ / Br / CH / N / C=O ring] | [two structures: HN−(CH₂)ᵣ−X′ with R₂; and HN−piperazine−N(CH₂)₂OCCH₃] | [structure: S-CH₃ / Br / CH / N-ring with N-piperazine-N(CH₂)₂OCCH₃] |

EXAMPLES 27 TO 36

Employing the procedure described in Example 5, but substituting the starting material shown in column A of Table II below, the 3-one in column B is obtained, by reacting the 3-one with the amine shown in column C, the product shown in column D is obtained.

TABLE II

| Example number | Column A<br>Starting Material | Column B<br>3 or 3'-one | Column C<br>HNR¹R² | Column D<br>Product |
|---|---|---|---|---|
| 27 | [structure: O-CH₃ / Cl / CH / N-CH₂CH₂COOH / CH / OCH₃] | [structure: O-CH₃ / Cl / CH / N ring with C=O / OCH₃] | H₂NCH₃ | [structure: O-CH₃ / Cl / CH / N ring with CH₂NH / OCH₃] |
| 28 | [structure: S-CH₃ / Cl / CH / N-CH₂CH₂COOH / CH / Cl] | [structure: S-CH₃ / Cl / CH / N ring with C=O / Cl] plus [structure: S-CH₃ / CH / N ring with C=O / Cl] | HN(CH₃)C₂H₅ | [structure: S-CH₃ / Cl / CH / N ring / C₂H₅(CH₃)N / Cl] plus [structure: S-CH₃ / CH / N ring with N(CH₃)C₂H₅ / Cl] |

TABLE II—Continued

| Example number | Column A<br>Starting Material | Column B<br>3 or 3'-one | Column C<br>HNR1R2 | Column D<br>Product |
|---|---|---|---|---|
| 29 | [structure: F₃C, Cl, S–CH₃ substituted diaryl amine with CH₂CH₂COOH] | [structure: 3-one with F₃C, Cl, S–CH₃] | H₂NCH₂CH=CH₂ | [structure] CH₂=CHCH₂NH |
| 30 | [structure: CF₃, Cl, O–CH₃ diaryl amine with CH₂CH₂COOH] | [structure: 3-one with CF₃, Cl, O–CH₃] | HN(C₂H₅)CH₂C₆H₅ | [structure] C₆H₅CH₂(C₂H₅)N |
| 31 | [structure: C₄H₉, S–CH₃, CH₃ diaryl amine with CH₂CH₂COOH] | [structure: 3-one] | H₂NC₆H₅ | [structure] C₆H₅NH |
| 32 | [structure: C₂H₅, S–CH₃, C₂H₅S diaryl amine with CH₂CH₂COOH] | [structure: 3-one] | HN(CH₂C₆H₅)₂ | [structure] (C₆H₅CH₂)₂N |
| 33 | [structure: cyclopropyl, O–CH₃ diaryl amine with CH₂CH₂COOH] | [structure: 3-one] | HN(CH₃)CH=CH₂ | [structure] CH₂=CH(CH₃)N |

TABLE II—Continued

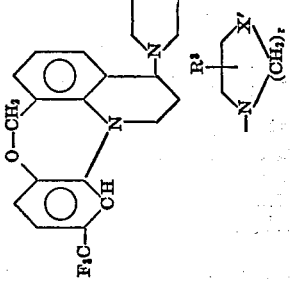

What is claimed is:
1. A compound having the structure

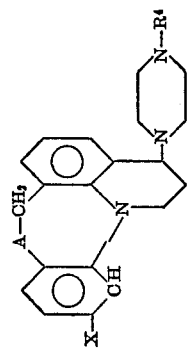

wherein A is O or S; X is trifluoromethyl or chloro; and R⁴ is hydrogen, lower alkyl or hydroxy-lower alkyl; wherein lower alkyl is an alkyl group having up to eight carbon atoms; and a non-toxic acid-addition salt thereof.
2. A compound in accordance with claim 1 wherein A is O.

3. A compound in accordance with claim 1 wherein A is S.
4. A compound in accordance with claim 1 having the structure

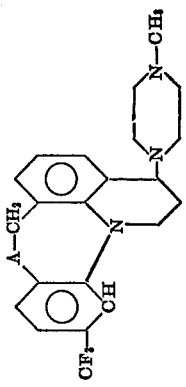

5. The compound in accordance with claim 1 having the structure in which X' represents NR⁴, O, S or CH₂, $r$ represents 1, 2 or 3; R⁴ represents hydrogen, lower alkyl, hydroxy-lower alkyl, lower alkanoyloxy-lower alkyl, hydroxy-lower alkoxy-lower alkyl; di(lower alkyl)amino-lower alkoxy lower alkyl, lower-alkylamino-lower alkyl, di-lower alkyl amino-lower alkyl, amino-lower alkyl; and $R^3$ represents any of the $R^4$ groups; $n$ is 0, 1 or 2; and $n'$ is 0, 1 or 2. These compounds are useful as central nervous system stimulants, muscle relaxants, anti-inflammatory agents, and antibacterial agents.

6. A compound having the structure

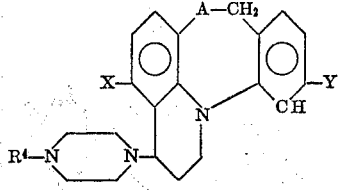

wherein A is O or S; X and Y are the same or different and are hydrogen or chloro, at least one of X and Y being hydrogen; and $R^4$ is hydrogen, lower alkyl, or hydroxy-lower alkyl; wherein lower alkyl is an alkyl group having up to eight carbon atoms; and a non-toxic acid-addition salt thereof.

7. A compound in accordance with claim 6 wherein A is O.

8. A compound in accordance with claim 6 wherein A is S.

9. A compound having the structure

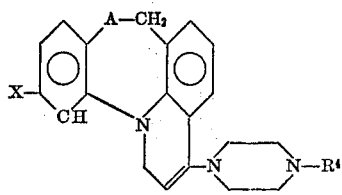

wherein A is O or S; X is trifluoromethyl or chloro; and $R^4$ is hydrogen, lower alkyl or hydroxy-lower alkyl; wherein lower alkyl is an alkyl group having up to eight carbon atoms; and a non-toxic acid-addition salt thereof.

10. The compound in accordance with claim 9 having the name 3-(4-methylpiperazinyl)-11-(trifluoromethyl)-1H,7H-quino[8,1-cd][1,5]benzoxazepine.

11. A compound having the structure

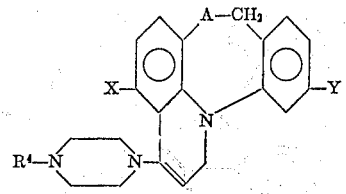

wherein A is O or S; X and Y are the same or different and are hydrogen or chloro, at least one of X and Y being hydrogen; and $R^4$ is hydrogen, lower alkyl, or hydroxy-lower alkyl; wherein lower alkyl is an alkyl is an alkyl group having up to eight carbon atoms; and a non-toxic acid-addition salt thereof.

References Cited
UNITED STATES PATENTS
3,707,471   12/1972   Albrecht et al. ___ 260—268 PC DONALD G. DAUS, Primary Examiner U.S. Cl. X.R.

252—106; 260—239 BC, 243 B, 247.1, 247.5 B, 283.6 N, 283.5 A, 283.5, 283.5 Y, 288 R, 327 B, 333

UNITED STATES PATENT OFFICE
CERTIFICATE OF CORRECTION

Patent No. 3,784,548                    Dated January 8, 1974

Inventor(s) Harry L. Yale and Ramesh B. Petigara

It is certified that error appears in the above-identified patent and that said Letters Patent are hereby corrected as shown below:

Column 4, line 36, the term "1'-position," should be:
-- 11'-position, --.

Column 7, line 56, delete the entire line and insert in its place: -- range of from about 0.9:1 to about 1:1, in the absence of --.

Column 7, line 59, the word "wtihin" should be: -- within --.

Column 13, line 10, the term " 10 ml. " should be: -- 100 ml. --.

Column 15, line 2, that portion reading: " 1H,7 " should be: -- 1H,7H --.

Column 17, Example 10, that portion of the title reading: " (2-hydroxyethyl)- " should be: -- (2-hydroxyethoxyethyl)- --.

Column 17, after line 69, insert the following line: -- benzene extracts are concentrated to dryness in vacuo. The --.

Column 18, line 10, that portion reading "[1,8-ab][1,4]" should be: -- [1,8-ab][4,1] --.

Column 30, claim 5, delete the portion starting with:

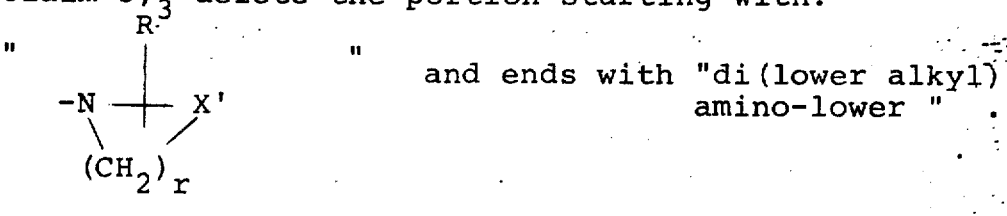

and ends with "di(lower alkyl) amino-lower ".

UNITED STATES PATENT OFFICE
CERTIFICATE OF CORRECTION

Patent No. 3,784,548           Dated January 8, 1974

Inventor(s) Harry L. Yale and Ramesh B. Petigara

It is certified that error appears in the above-identified patent and that said Letters Patent are hereby corrected as shown below:

Column 31, claim 5, delete lines 1 to 6.

Signed and sealed this 23rd day of April 1974.

(SEAL)
Attest:

EDWARD M.FLETCHER,JR.                C. MARSHALL DANN
Attesting Officer                    Commissioner of Patents